United States Patent
Shoup

(10) Patent No.: US 6,843,186 B2
(45) Date of Patent: Jan. 18, 2005

(54) NARROW ROW SPACING PLANTER

(76) Inventor: Kenneth E. Shoup, 17649 Richmond, Plainfield, IL (US) 60544

( * ) Notice: Subject to any disclaimer, the term of this patent is extended or adjusted under 35 U.S.C. 154(b) by 0 days.

(21) Appl. No.: 10/404,779

(22) Filed: Mar. 31, 2003

(65) Prior Publication Data

US 2004/0187756 A1 Sep. 30, 2004

(51) Int. Cl.$^7$ ................................................ A01C 7/00
(52) U.S. Cl. ........................................................ 111/59
(58) Field of Search ............................ 111/8, 9, 14, 15, 111/18, 22, 25, 34, 52, 59, 60, 66, 69, 92

(56) References Cited

U.S. PATENT DOCUMENTS

| | | |
|---|---|---|
| 3,888,387 A | 6/1975 | Deckler |
| 4,273,057 A | 6/1981 | Pollard |
| 4,450,979 A | 5/1984 | Deckler |
| 4,461,356 A | 7/1984 | Larson |
| 4,539,921 A | 9/1985 | Morlock |
| 4,646,851 A | 3/1987 | Duello |
| 4,648,334 A | 3/1987 | Kinzenbaw |
| 4,771,713 A | 9/1988 | Kinzenbaw |
| 5,406,897 A | 4/1995 | Pingry |
| 5,535,688 A | 7/1996 | Kaufman |
| 6,520,100 B1 * | 2/2003 | Spooner et al. ................ 111/59 |

* cited by examiner

Primary Examiner—Robert E. Pezzuto
(74) Attorney, Agent, or Firm—Emrich & Dithmar LLC; Harry M. Levy

(57) ABSTRACT

An agricultural implement with an elongated bar having a front side nearer in use to a drive vehicle and a rear side. A first plurality of row units are laterally spaced apart along the bar and extend rearwardly thereof connected through parallel linkage to the front side of the elongated bar. A second plurality of row units are laterally spaced apart along the bar and extend rearwardly thereof interleaved with the first plurality of row units and connected through parallel linkage to the rear side of the bar. Parallel linkage for both the first and second plurality of row units is directly mounted to and extends rearwardly of and below the bar to position all row units to the rear of the bar, allowing both field crops or row crops to be planted.

20 Claims, 7 Drawing Sheets

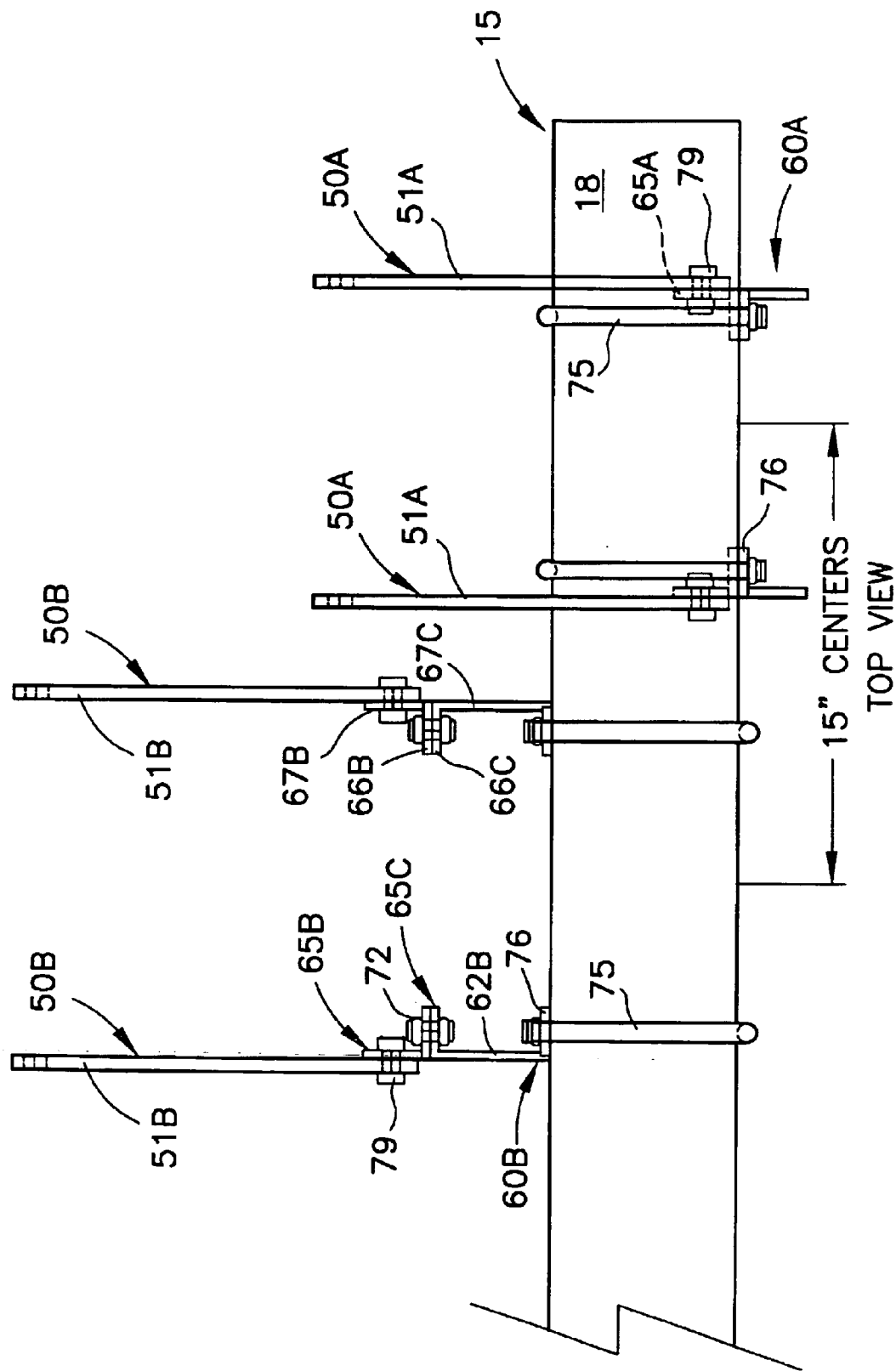

NARROW ROW SPACING PLANTER

FIELD OF THE INVENTION

The present invention relates to agricultural planters, and more particularly, it relates to a row crop planter which is capable of planting crops at a relatively wide row spacing, yet which is easily convertible without adding or removing any structure to plant a crop at a row spacing approximately one-half of the wide spacing. Such a planter enables a farmer, for example, to plant corn at 30" row spacing and thereafter plant soy beans at 15" spacing, without physically removing, attaching or relocating individual row units.

BACKGROUND OF THE INVENTION

It is fairly common practice for farmers having larger farms to plant more than one crop. In the Midwest, a farmer may plant both corn and soy beans and in western states, a farmer may plant corn and wheat. Typically, corn being the larger crop, is planted in a row spacing of about 30", using presently available hybrid corn. Soybeans may be planted at smaller spacings such as 15" spacing, depending on the preferences and equipment of the farmer.

Since the planting season typically may include only a relatively few days of good planting weather, it has become highly desirable to minimize the amount of time necessary to convert a planter from one crop to another. One solution to the above-mentioned problem is to provide a tandem planter, that is, two identical planters, one pulled behind the other with the row units of the two planters being offset so that the row units of the rear planter are located to form furrows midway between the furrows formed on the forward planter. However, tandem planters are expensive and have a considerable length such that they become unwieldily in making critical field maneuvers and in transport.

Another attempt to provide interplant row units is to mount the interplant units on the same mounting bar as the regular units so that the mounting units are side by side across the planter frame. This is possible and enables the achievement of 15" rows because commercial row units of a desirable type having double disc furrow openers and adjacent gauge wheels are available and they have a nominal width of about 15", leaving 15" between adjacent row units modeled to plant row spaced at 30". There are, however, difficulties with such arrangements. It has been found in practice that when row units are mounted on a common bar in side-by-side relation, the adjacent gauge wheels of adjacent units are very close to one another and provide a natural trap for unbroken clods of soil or trash such as corn stalks or remaining unburied crop. This problem has become exacerbated with modern conservation planting techniques which leave more and more trash on the surface of the soil. Moreover, side-by-side positioning of row units unduly restricts access for farmers to replenish seed or other material in the hoppers or bins for the row units or to repair same, when required.

Some attempts at solving the above-identified problem have been to mount some individual row units in front of one or more transverse bars so that these units are pushed or driven rather than pulled. While this arrangement permits easy access to the hoppers for replenishing the commodity in the hopper, it also requires pushing at least half of the units which is less satisfactory than pulling all of the units. Moreover, using both push and pull row units may require separate hydraulic mechanism for lifting and lowering the units and for placing the support wheels or drive wheels of the agricultural implement so as not to interfere with the operation of the row units.

SUMMARY OF THE INVENTION

Accordingly, it is a principal object of the present invention to provide an agricultural device in which row units are in two groups, one of which can be used for wide row crops such as corn when used together can plant narrow row crops such as soy beans or wheat.

Another object of the present invention is to provide an agricultural implement of the type set forth in which all row units are pulled rather than some of the units being pushed and some of the units being pulled.

Still another object of the present invention is to provide an agricultural implement of the type set forth in which parallel linkage structure connecting the row units to the frame extend underneath or are positioned below the frame, with the support or drive wheels to forward of the frame member to which the row units are connected.

A final object of the present invention is to provide an agricultural device of the type set forth in which alternate row units are staggered rearwardly so as to provide easy access to the units for the farmer and to prevent trash build-up between adjacent gauge wheels.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIG. 7 is a top view of the tool bar and mechanism shown in FIGS. 5 and 6.

DESCRIPTION OF THE PREFERRED EMBODIMENT

Figure 1:
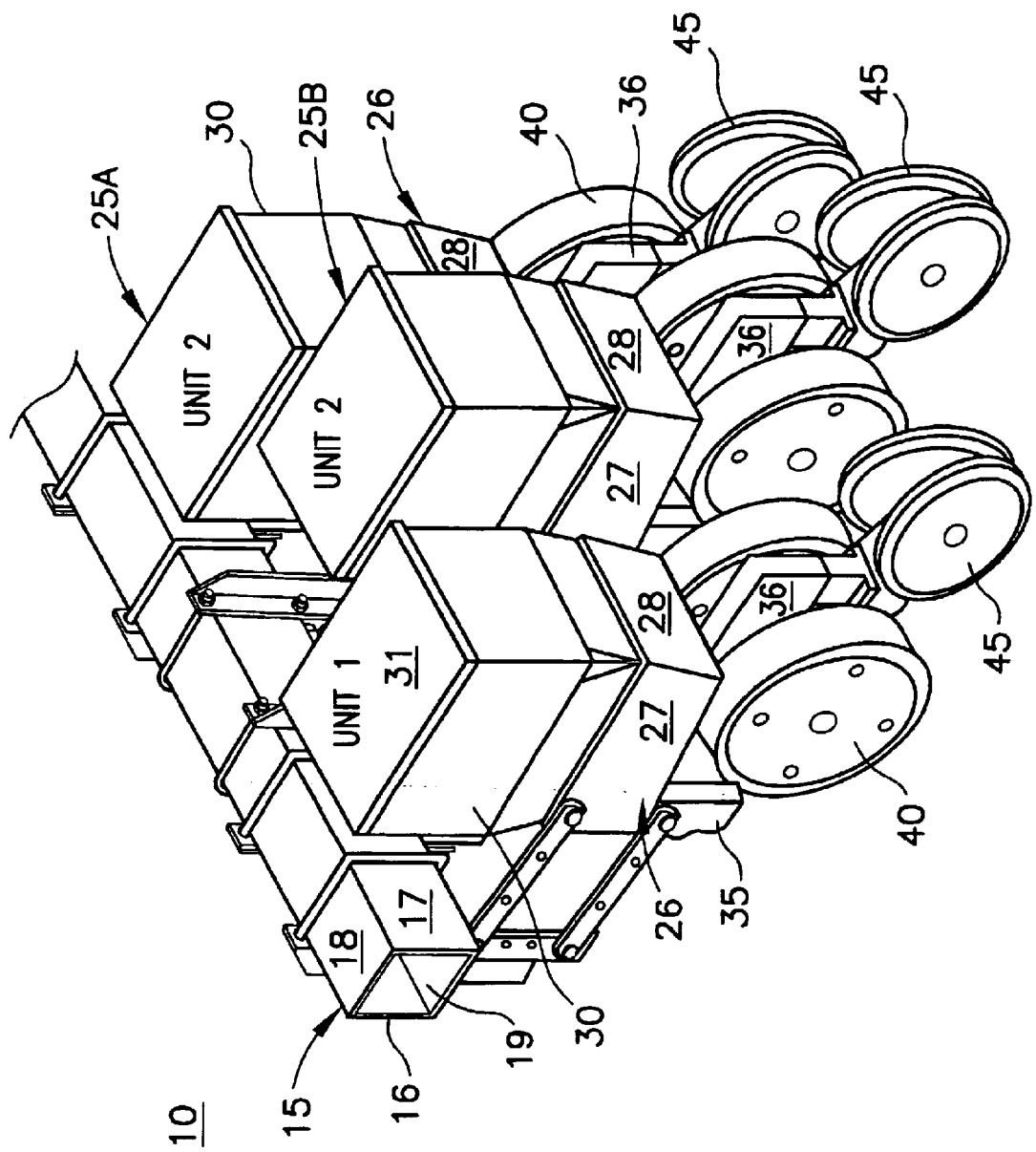
FIG. 1 is a perspective view of a series of row units mounted to a tool bar extending laterally with respect to the drive vehicle.
Figure 2:
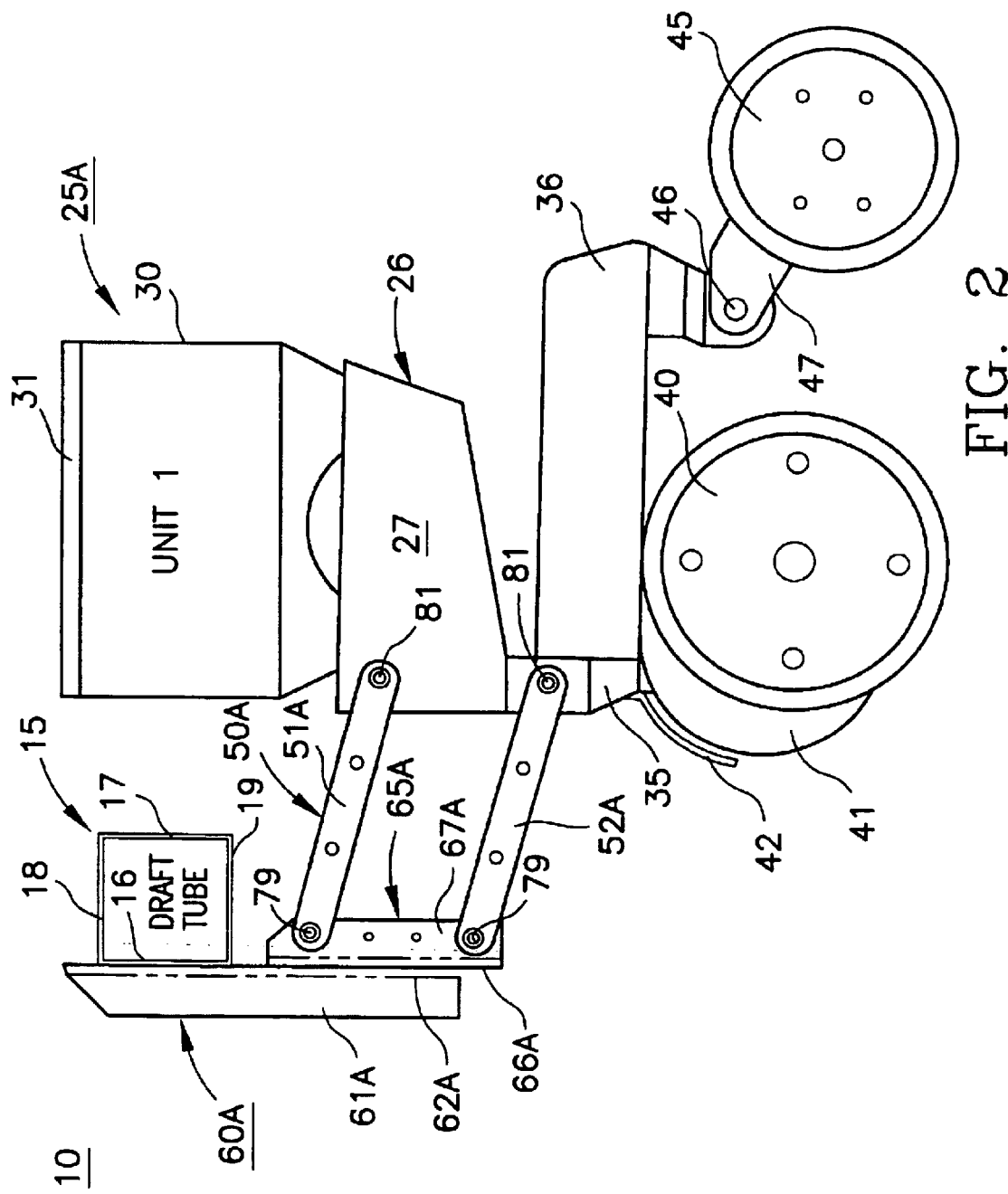
FIG. 2 is an enlarged side elevational view of row unit mounted to the front of the draft tube.
Figure 3:
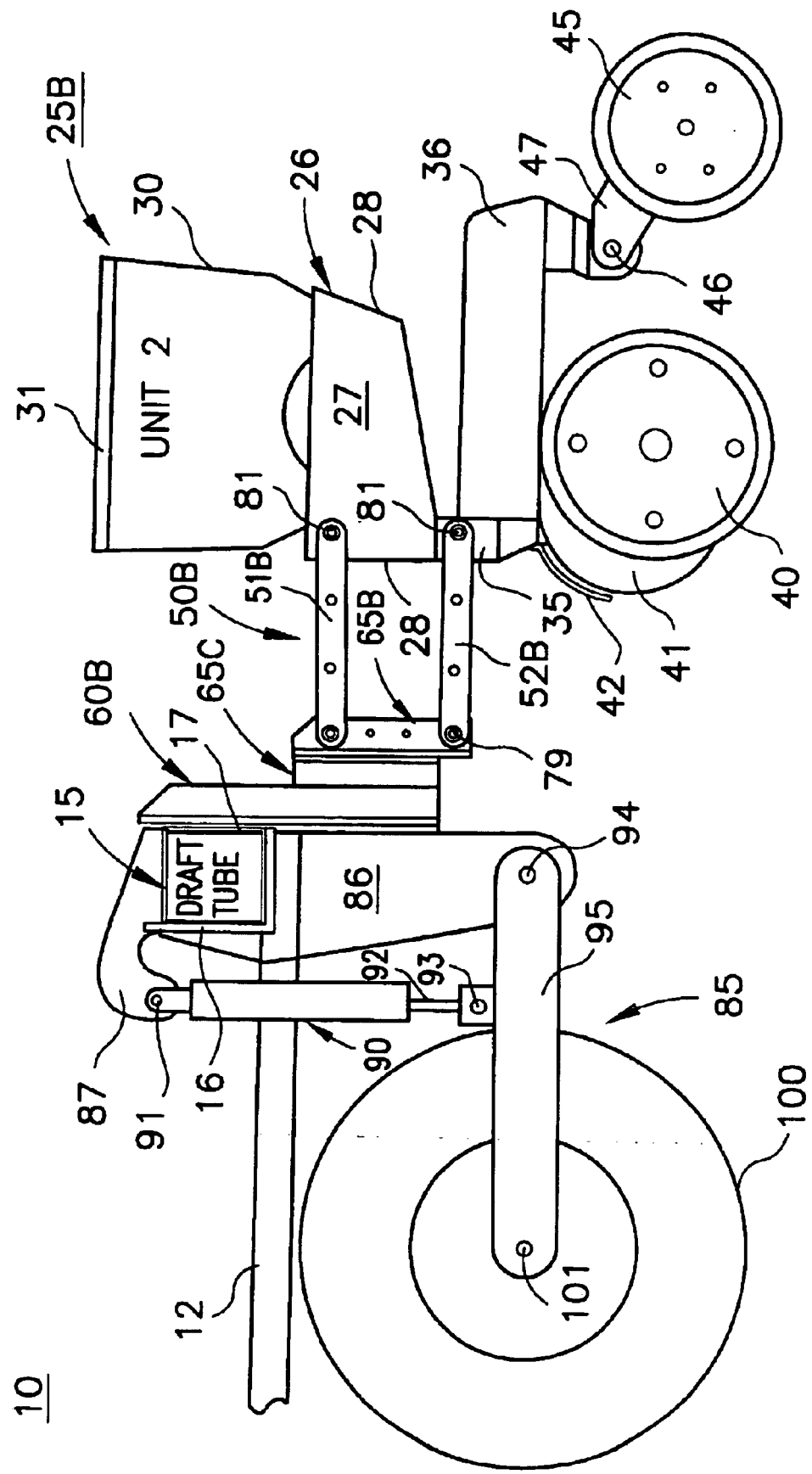
FIG. 3 is a view like FIG. 2 showing a row unit mounted to the rear of the draft tube and further showing the support or drive wheels in the working or field position.
Figure 4:
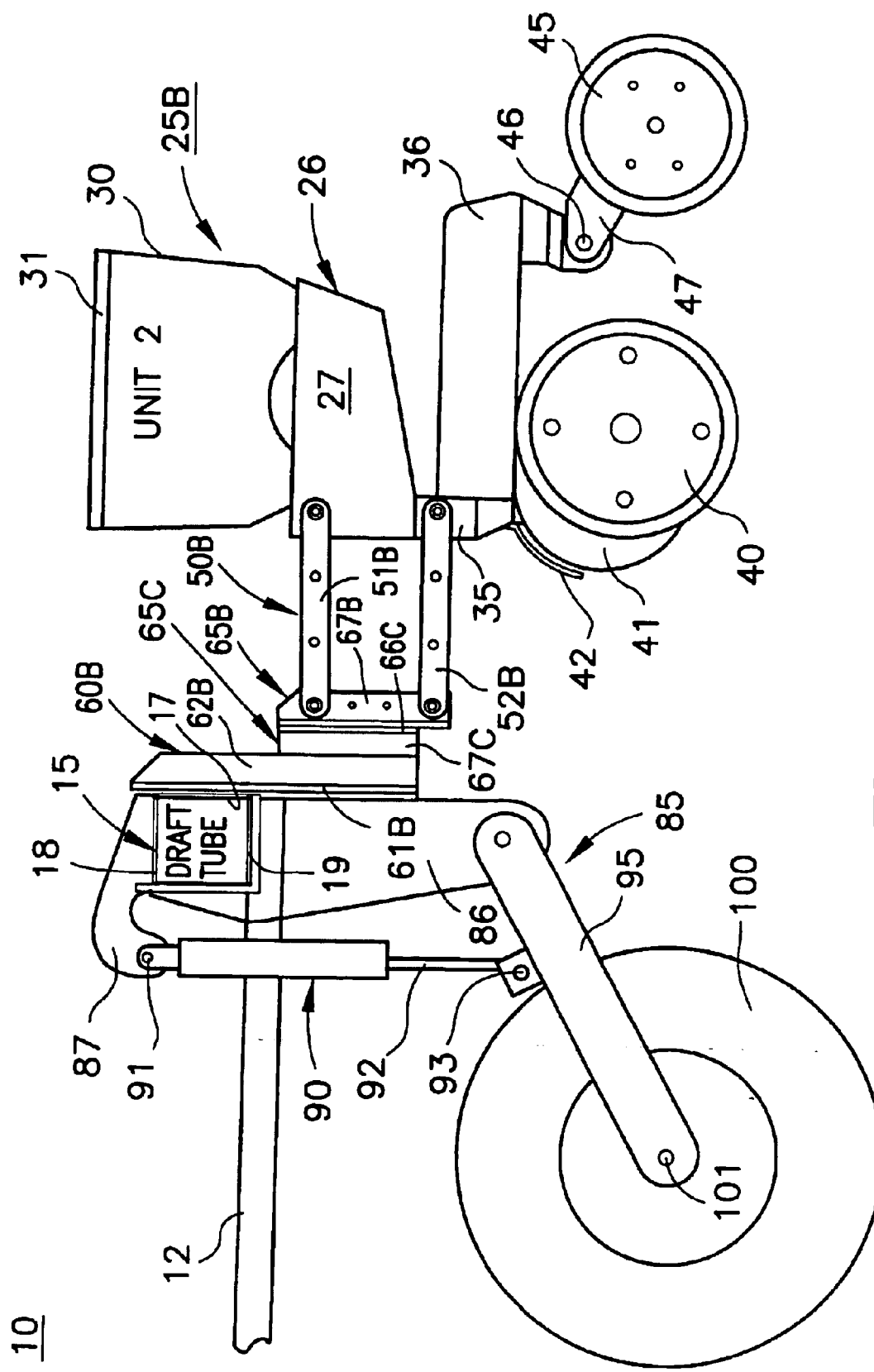
FIG. 4 is a view like FIG. 3 showing the support or drive wheels in the elevated or transport position.
Figure 5:
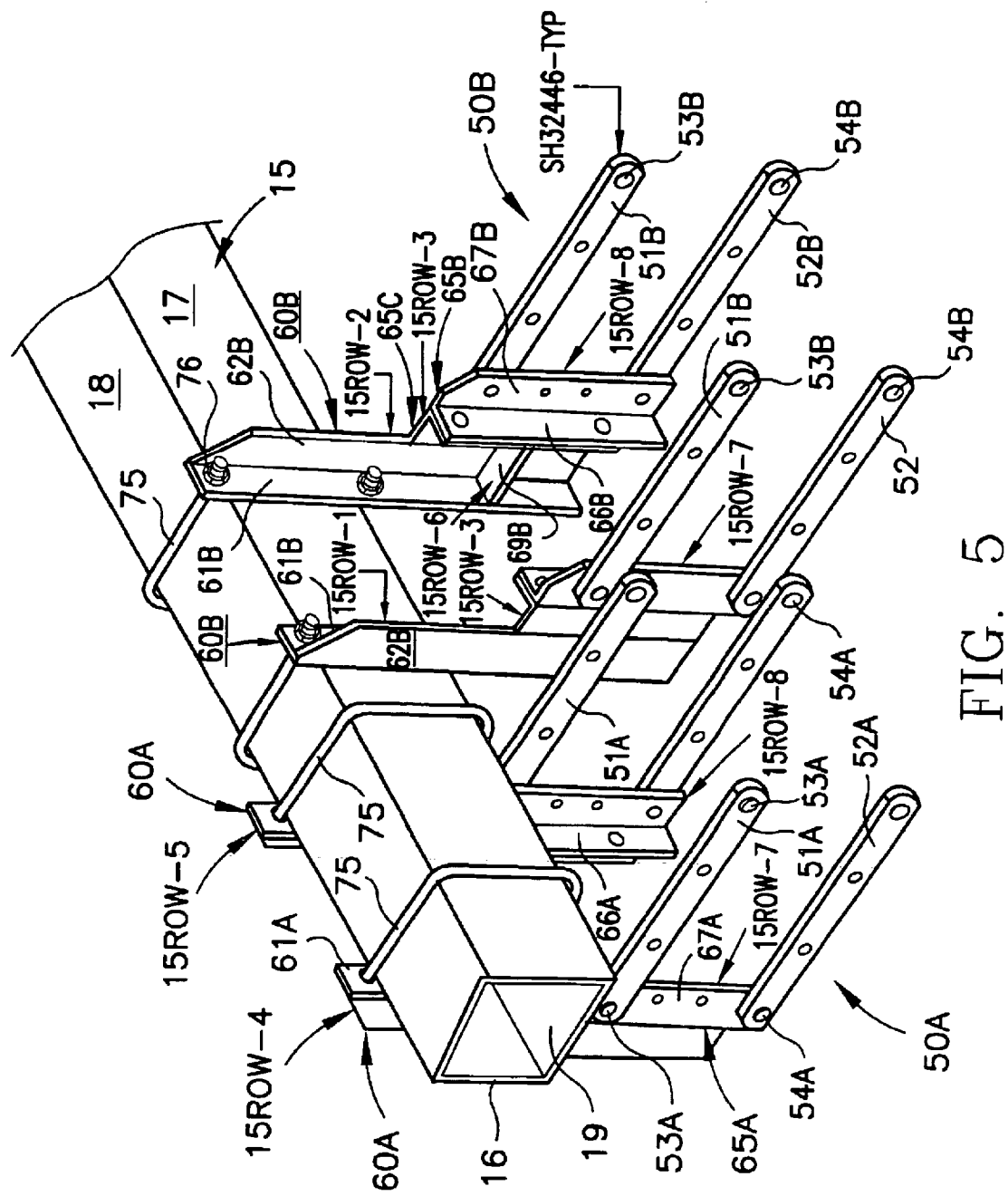
FIG. 5 is an elevational view showing the mounting structure for row units.
Figure 6:
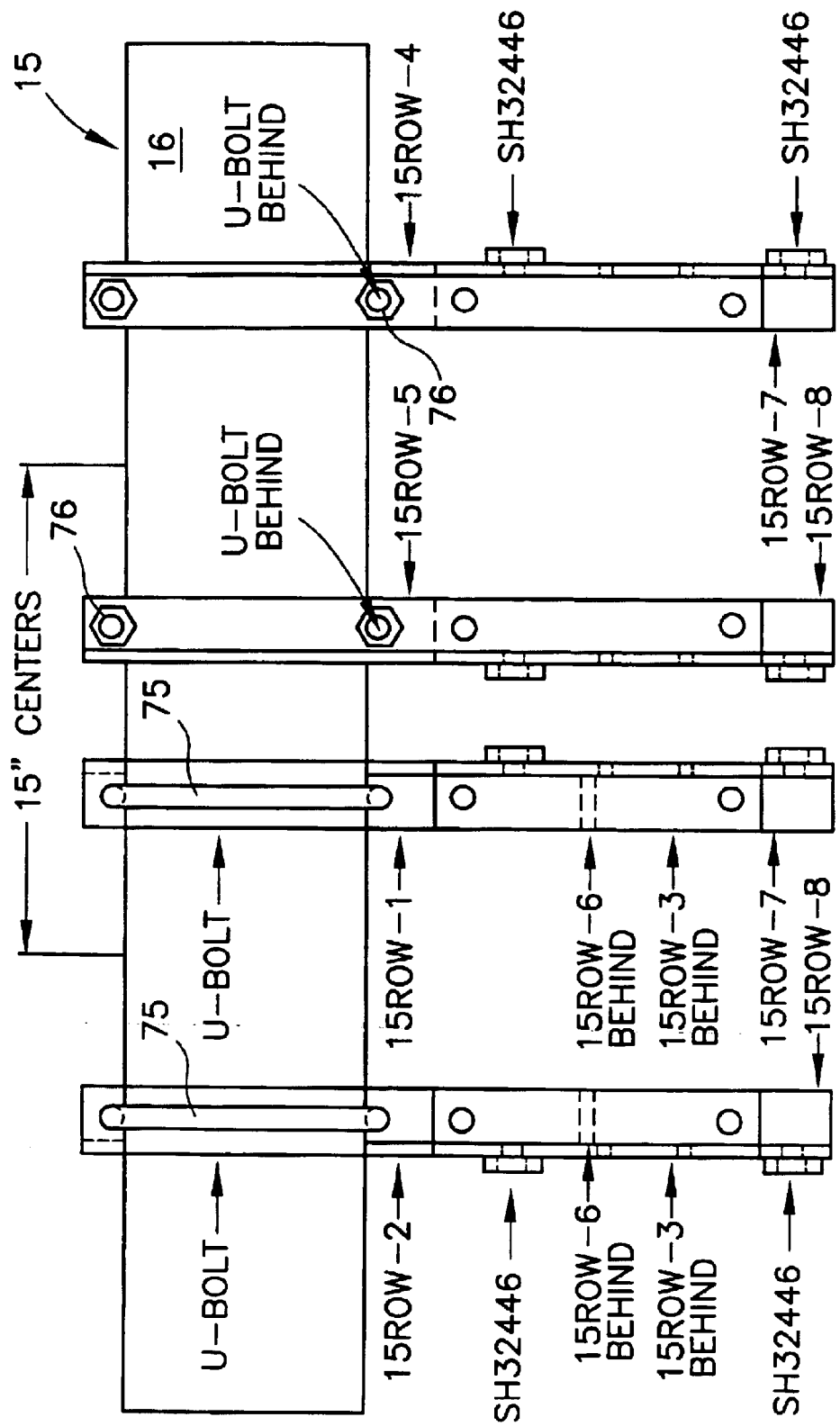
FIG. 6 is a front view of the tool bar and associated linkage shown in FIG. 5.

Referring now to FIGS. 1–4, there is disclosed a planter 10 connected to a drive vehicle (not shown) which would be situated to the left as the planter is viewed in FIGS. 1–4. As seen in FIGS. 3 and 4, a frame member 12 extends between a draft tube 15 and the drive vehicle. The frame 12 may take the form of a generally rectangular frame member in which two struts 12 form a triangle with the apex of the triangle meeting at the connection point of the frame to the drive vehicle or tractor with the third member being positioned underneath it. This connection to the tractor is well known in the art and may take a variety of forms but is represented by the frame member 12. The draft tube 15 extends in use laterally to the direction of travel of the agricultural implement 10 and is in the form of a hollow tube having a front side 16, a rear side 17, and top and bottom 18 and 19, respectively. When the front of an apparatus is referred to herein, it is meant the portion of the apparatus toward the drive vehicle or tractor.

Row units 25A and 25B and thus seen in FIGS. 1–3 are laterally spaced apart along the draft tube 15, the row units 25A being generally placed for wide spaced crops such as corn, for instance at 30" center to center, while the row units 25B are likewise arranged and positioned intermediate row units 25A. Therefore, when all row units 25A and B are being simultaneously used, the crops will be planted at 15" spacing, whereas when only alternate row units are used, then the crop will be planted at 30".

Referring now to FIGS. 1–3, the row units 25A and B are identical in structure, the only difference being in the frame structure mounting the row units to the draft tube 15. Each row units 25A and B has cradle structure 26 including opposed side panels 27 and end panels 28. Further, each row unit 25 includes a hopper 30 and a lid 31. The designation A and B is used to indicate alternate row units with row units 25A being indicated as row unit 1 for purposes of illustration, whereas unit 2 is indicated as 25B. It being seen from the drawings that the B units are spaced rearwardly of the A units in use, the extent to which may be adjusted, as will be described.

Further, each of the row units 25A and B include a shank 35 extending downwardly and generally parallel to the draft tube 15 and supports the cradle 26. A rearwardly extending shank 36 extends from the shank 35 to provide frame work on which are mounted spaced apart gauge wheels 40, openers 41 with associated scrapers 42 and closers 45 mounted on frame member 47 by means of a pivot shaft 46. The gauge wheels 40, openers 41, and closers 45 are all standard farm implements and well known in the art.

Standard parallel linkage 50 connects the row units 25A and B to the draft tube 15 and includes upper and lower linkages 51 and 52 respectively with apertures 53 being in the upper links 51 and apertures 54 in the lower links 52. Linkage 50 is noted with a capital A or capital B depending on which row unit 25A or 25 B the linkage 50 serves to connect to the draft tube 15. As seen, the row units 25A are mounted to the front side 16 of the draft tube 15 while row units 25B are mounted to the rear side 17 of the draft tube 15.

Referring particularly to FIGS. 1, 2 and 5–7, the linkage 50 and mounting mechanism for the row units 25A are illustrated. The linkage 50A connects the row unit 25A to a vertically extending angle iron 60A. The angle iron 60A has flanges 61A and 62A perpendicular to each other with flange 62A extending from just above the top of the draft tube 15 to well below it and mounted to the front side 16. Another angle iron 65A is positioned with perpendicular flanges 66A and 67A to the rear of the angle iron 60A and more particularly the sides 62A and 66A are connected by suitable bolts 76 as seen in FIG. 7. The links 50A including the upper links 51A and lower link 52A are connected to the angle irons 65A by suitable bolts 79 and to the row units 25A at the cradle side 27 by bolt 81 and to the shank 35 by bolt 81. As may be seen from the drawings, particularly FIGS. 5, 6 and 7, the parallel linkages 50A and the angle irons to which they are connected, are mounted to the front side 16 of the draft tube 15 by means of spaced apart bolts 75 secured by appropriate fasteners 76. Therefore, although the row units 25A extend rearwardly of the draft tube 15, the row units 25A are mounted to the front side 16 of the draft tube.

Referring specifically now to the aforementioned drawings and FIG. 3, it is seen that row units 25B are also connected to the draft tube 15 and extend rearwardly but the row units 25B are connected to the rear surface or side 17 of the draft tube 15. Angle irons 60B are provided and are similar or identical to the angle irons 60A having flanges 61 B and 62B. For each row unit 25B, there is extra hardware provided in the form of an angle iron 65B which corresponds to the previously described angle iron 65A and is spaced from the angle iron 60B by a third angle iron 65C. Angle iron 65C is connected to angle iron 65B by a series of bolts 72 while the angle iron 67B is connected to the associated linkage 50B by means of bolts 79. A strengthening member 69B connects angle irons 60B and 65C.

FIGS. 3 and 4 particularly show the support wheel assemblies 85 which are connected by means of a support member 86 extending downwardly from the draft tube 15, the support member 86 having a top portion 87, from which hangs a hydraulic cylinder 90. Hydraulic cylinder 90 is mounted to support member 86 by means of a upper pivot pin 91, the hydraulic cylinder 90 having a piston 92 connected to a pivot 93 on a linkage 95 connected to the support or drive wheel 100 as at stub shaft or axle 101. FIG. 3 illustrates the support or drive wheels 100 in the working or field position in which the gauge wheels 40 and associated openers 41 and closers 45 are also in contact with the ground as seed or other material are introduced into the field. By extending the piston 92 of the hydraulic cylinder 90 with standard hydraulic mechanisms connected to the tractor (not shown), the frame 12 along with the associated mechanism including all of the row units 25A and 25B are elevated off the ground either at the end of a row when the planter 10 must be turned or when the planter 10 is being hauled along the road.

Several aspects of the present invention are of considerable importance, the first being that all of the row units 25A and 25B are positioned to the rear of the draft tube 15. As seen in the drawings, the row units 25A are rearwardly staggered with respect to the row units 25B. Row units 25B extend further rearwardly than the row units 25A, thereby facilitating maintenance, access to the hoppers 30 and preventing trash build-up between the adjacent row units and particularly the gauge wheels 40 thereof. The extent to which row units 25A and B are staggered may be varied depending on the structure of the angle irons 60B, 65B and 65C. As before stated in the Background of the Invention, no till farming has increased the amount of trash present in many fields and staggering the row units 25A and 25B alleviates a serious trash problem. An additional feature of the present is the location of the support or drive wheels 100 forward of the draft tube 15 thereby providing substantial room to the rear of the draft tube for the row units 25A and B. Although discussed hereinbefore that the row units 25 may be placed on 30" centers, it is clear that a variety of spacings may be useful in the present invention.

Another important aspect of the present invention is that in the field or working position as illustrated in FIG. 3, the bottom of the draft tube 15 is preferably no less than 31" above the ground as compared to the usual frame height of about 21". The additional vertical room obtained by raising the frame members an extra 10" above the ground permits the row units 25A and B to be located rearward of the draft tube 15 and all the linkage 50 therefore positioned below the draft tube. The wheels 100 have to be forward of the draft tube 15 as in the present construction, there is no room for them to the rear of the draft tube as is common practice. Movement of the support wheel assemblies 85 including the associated mechanism forward of the draft tube 15 also moves the center of gravity of the unit forward using pivot 94 as a fulcrum when the unit is elevated to the transport position as shown in FIG. 4. By elevating the frame, the linkage 50, at least for the row units 25A, can pass underneath the draft tube 15 still permitting the planter 10 to move up and down through the field as required. The linkage 50 for the row units 25B are also positioned below the draft tube 15 but do not extend beneath the draft tube.

While particular embodiments of the present invention have been shown and described, it will be appreciated by those skilled in the art that changes, modifications and improvements may be made, for example in the processing of the materials or in the electrode and/or cell design without departing from the true spirit and scope of the invention.

I claim:

1. An agricultural implement comprising an elongated bar having a front side nearer in use to a drive vehicle and a rear side and extending in use laterally to the drive vehicle, a first plurality of row units laterally spaced apart along said elongated bar connected through parallel linkage to said elongated bar; and a second plurality of row units laterally spaced apart along said elongated bar interleaved with said first plurality of row units connected through parallel linkage to said elongated bar; the parallel linkage for both said first and second plurality of row units being mounted to and extending rearwardly of and below said elongated bar to position all row units to the rear of said elongated bar.

2. The agricultural implement of claim 1, and further including for each row unit a pair of gauge wheels on either side of a furrow opener and furrow closer.

3. The agricultural implement of claim 1, wherein each of said second plurality of row units is positioned about one half the distance between adjacent first row units.

4. The agricultural implement of claim 1, wherein each row unit carries a dedicated seed bin.

5. The agricultural implement of claim 1, wherein at least some of the first row units are staggered with respect to at least some of the second row units in a direction rearwardly of said elongated bar.

6. The agricultural implement of claim 1, wherein the parallel linkage for at least some of the row units are positioned beneath said elongated bar.

7. The agricultural implement of claim 1, wherein all of said first or second row units are evenly spaced apart a first distance to facilitate planting field crops the others of said first or second row units are interleaved to halve the first distance to facilitate planting of row crops.

8. The agricultural implement of claim 7, wherein said first row units are spaced about 30" apart and said second row units are spaced about 30" apart to facilitate crop planting for 30" rows and 15" rows.

9. The agricultural implement of claim 8, wherein each row unit has a dedicated seed bin and a pair of gauge wheels on either side of a furrow opener and furrow closer located to rear of said elongated bar.

10. The agricultural implement of claim 9, wherein said first plurality of row units are connected to one side of said elongated bar and said second plurality of row units are connected to the other side of said elongated bar.

11. An agricultural implement comprising an elongated bar having a front side nearer in use to a drive vehicle and a rear side extending in use laterally to said bar; a first plurality of row units laterally spaced apart along said elongated bar extending rearwardly thereof and connected through parallel linkage to the front side of said elongated bar; and a second plurality of row units laterally spaced apart along said elongated bar extending rearwardly thereof interleaved with said first plurality of row units and connected through parallel linkage to the rear side of said elongated bar; the parallel linkage for both said first and second plurality of row units being directly mounted to and extending rearwardly of and positioned below said elongated bar to position all row units to the rear of said elongated bar.

12. The agricultural implement of claim 11, wherein each of said second plurality of row units is offset about one half the distance between adjacent first row units.

13. The agricultural implement of claim 11, wherein the bottom of said elongated bar when in a working position is not less than about 31 inches above the ground.

14. The agricultural implement of claim 13, wherein at least some of the first row units are staggered with respect to some of the second row units in a direction rearwardly of said elongated bar.

15. The agricultural implement of claim 12, wherein the row units are laterally spaced apart substantially the same distance and the linkage of all of the first plurality of row units extends rearward and beneath said elongated bar, the second plurality of row units extending rearwardly a greater extent than said first plurality of row units.

16. The agricultural implement of claim 15, wherein said first row units are spaced about 30" apart and said second row units are spaced about 30" apart to facilitate crop planting for 30" rows and 15" rows.

17. The agricultural implement of claim 15, wherein each row unit is mounted to a pair of vertically extending members bolted to said elongated bar.

18. An agricultural implement comprising a frame detachably connected to a drive vehicle, an elongated bar having a front side nearer in use to the drive vehicle and a rear side and extending in use laterally to and connected to said frame, a plurality of support wheels connected to said elongated bar extending forward of said elongated bar toward the drive vehicle, said frame being movable with respect to said support wheels between a working position and an elevated transport position, a first plurality of row units laterally spaced apart along said elongated bar connected through parallel linkage to the front side of and extending beneath said elongated bar; and a second plurality of row units laterally spaced apart along said elongated bar interleaved with said first plurality of row units connected through parallel linkage to the rear side of and positioned below said elongated bar; the parallel linkage for both said first and second plurality of row units being directly mounted to said elongated bar and extending rearwardly of said elongated bar to position all row units to the rear of said elongated bar.

19. The agricultural implement of claim 18, wherein the bottom of said elongated bar is not less than about 31" above the ground where the frame is the working position thereof.

20. The agricultural implement of claim 19, wherein said support wheels connected to said elongated bar are hydraulically connected to the drive vehicle to permit the user to elevate said frame and said row units carried thereby from the working position to the elevated transport position.

* * * * *